United States Patent

Sola

[11] Patent Number: 6,092,756
[45] Date of Patent: ***Jul. 25, 2000

[54] SUPPORT OF A COMBINED FEED-OUT/ FEED-IN DEVICE FOR A COILABLE TUBING

[75] Inventor: Kjell Inge Sola, Tananger, Norway

[73] Assignee: Transocean Petroleum Technology AS, Tananger, Norway

[*] Notice: This patent is subject to a terminal disclaimer.

[21] Appl. No.: 09/125,053

[22] PCT Filed: Feb. 5, 1997

[86] PCT No.: PCT/NO97/00033

§ 371 Date: Aug. 4, 1998

§ 102(e) Date: Aug. 4, 1998

[87] PCT Pub. No.: WO97/29269

PCT Pub. Date: Aug. 14, 1997

[30] Foreign Application Priority Data

Feb. 12, 1996 [NO] Norway ...................................... 960539

[51] Int. Cl.[7] .................................................. B65H 75/44
[52] U.S. Cl. ................................... 242/399.2; 242/397.1; 242/564.3; 242/566; 166/77.2
[58] Field of Search .............................. 242/399.1, 399.2, 242/403, 397.1, 564.4, 566, 559.1, 564.3; 166/77.2, 77.3

[56] References Cited

U.S. PATENT DOCUMENTS

| | | |
|---|---|---|
| 2,290,037 | 7/1942 | Dennison . |
| 3,140,063 | 7/1964 | Bucklen . |
| 3,670,988 | 6/1972 | Leonard . |
| 4,515,220 | 5/1985 | Sizer et al. . |
| 4,621,403 | 11/1986 | Babb et al. . |
| 4,681,168 | 7/1987 | Kisling, III . |
| 5,360,075 | 11/1994 | Gray . |
| 5,660,235 | 8/1997 | Sola ....................................... 166/384 |

FOREIGN PATENT DOCUMENTS

| | | |
|---|---|---|
| 122839 | 10/1984 | European Pat. Off. . |
| 380148 | 8/1990 | European Pat. Off. . |
| 2218721 | 11/1989 | United Kingdom . |

*Primary Examiner*—Donald P. Walsh
*Assistant Examiner*—William A. Rivera
*Attorney, Agent, or Firm*—Andrus, Sceales, Starke & Sawall

[57] ABSTRACT

A combined feed-out/feed-in device (20) serves to feed a coilable tubing (12, 12') out or in, respectively, in relation to a rotatable drum (10) during uncoiling and coiling, respectively, of the coilable tubing (12, 12') on the drum (10). The drum (10) is placed on a rack part (16) which is pivotally disposed in relation to a support rack (18) about an axis parallel to the rotational axis (14). In order to obtain a positioning of the feed-out/feed-in device (20), the drum (10) and the coilable tubing (12, 12') in mutual positions of readiness entailing an absolute minimum rigging time, the feed-out/feed-in device (20) is placed on the drum's (10) support rack (18), and an outer end connector (30) is permanently mounted on the outermost end of the coilable tubing (12, 12') after the tubing has been passed through said through-going passage (20').

1 Claim, 4 Drawing Sheets

SUPPORT OF A COMBINED FEED-OUT/FEED-IN DEVICE FOR A COILABLE TUBING

BACKGROUND OF THE INVENTION

This invention relates to a support of a combined feed-out/feed-in device for a coilable tubing capable of being uncoiled and coiled up on a rotatable drum by means of the feed-out/feed-in device. Preferably, such a feed-out/feed-in device comprises two opposing feeding means defining a through-going passage for the coilable tubing through the device and exhibiting reversible feeding directions, such that the operative portions of the feeding means in pulling/pushing contact with the coilable tubing, in one feeding direction, pull the coilable tubing off the rotatable drum and, in the opposite feeding direction, push the coilable tubing in a direction towards the drum in order to coil it up thereon. The constructive shape and design of the feeding means may vary, the only requirement presupposing that the operative portions of the feeding means attack on opposite sides of the coilable tubing, developing friction therebetween, and displace themselves in a direction away from the drum or towards the same, respectively, upon uncoiling or coiling, respectively. Combined feed-out/feed-in devices are known, in which the feeding means consist of two opposing endless bands/belts, the adjacent rectilinear portions constituting said operative portions and defining the intermediate, through-going passage for the tubing. Said adjacent portions of the two endless belts rest against opposite sides of the coilable tubing and feed the same inwards or outwards in relation to the drum, dependent on the common direction of motion of said operative belt portions.

U.S. Pat. No. 5,660,235, discloses a method and a device for use in connection with operations utilizing coilable tubing, the purpose being to reduce bending and (following) straightening movements during each coiled tubing operation or running. According to this application, the coiled tubing drum and the feed-out/feed-in device are each placed on a rack part of their own, the two rack parts constituting parts of a common rack, in which the drum is placed on a rack part which is pivotally disposed about an axis parallel to the rotational axis of the drum in relation to the rack part carrying the feed-out/feed-in device, and in which the drum and the feed-out/feed-in device at any time, e.g. during the rotation of the common rack in relation to a blowout preventer installed in the operative position thereof, maintain a permanent position and orientation in relation to each other.

In per se, one may imagine that the feed-out/feed-in device was not coupled to the common support rack, but instead constituted for instance a separate unit placed on a frame, the coiled tubing drum carried by the support rack being mounted thereafter, after which the coilable tubing was uncoiled from the drum through the feed-out/feed-in device. However, the disadvantage of such an arrangement is that the end of the coilable tubing carries an end connector at which hydraulic hoses and/or current carrying cables are terminated and adapted to be coupled to a downhole tool/equipment. The end connector has a larger diameter than the coilable tubing, and the through-going passage of the feed-out/feed-in device is too narrow for letting said end connector through when the device is dimensioned for feeding a thinner coilable tubing therethrough. When said feed-out/feed-in device is mounted on a separate support frame, these restrictions imply that said end connector has to be coupled on or uncoupled, respectively, prior to each coiled tubing operation and subsequent to each finished coiled tubing operation, respectively.

If a feed-out/feed-in device has a separate frame, the rigidity of a coilable tubing will require that the feed-out/feed-in device must be spaced such in relation to the drum that a certain distance exists therebetween, in order to manually straighten out and thread the coilable tubing into and through the feed-out/feed-in device.

SUMMARY OF THE INVENTION

Through a combination of features the present invention is characterized in a) that the feed-out/feed-in device is permanently attached to the support rack of the coiled tubing drum where the feed-out/feed-in device is positioned and orientated such in relation to the coiled tubing drum that an imagined extension of the through-going passage of the feed-out/feed-in device extends tangentially to the circumference of the coilable tubing coil that, at any time, is the outermost on the drum, when the latter is rotated on a rack part which is rotatable in relation to the rack part of the feed-out/feed-in device's rack part of the common support rack, about an axis parallel to the rotational axis of the drum; and b) that an end connector having a larger lateral dimension than the through-going passage of the feed-out/feed-in device for the feed-through of the coilable tubing is capable of letting through, is permanently disposed on the outer end of the coilable tubing passed through the feed-out/feed-in device.

By means of the invention a substantial reduction of the rigging time is achieved, a very important fact indeed. Another important feature is that one avoids such damages normally connected with operations such as pulling the coilable tubing manually into the feed-out/feed-in device prior to each coiled tubing operation.

Thus, the arrangement is such that, when the rotatable rack part of the coiled tubing drum has rotated back upon the coilable tubing's feeding in/coiling up on the drum, and has reached back into the stable non-sloping resting position, the end connector of the coilable tubing is situated in the immediate neighbourhood of the end of the feed-out/feed-in device opposite the drum, occupying a position of readiness and, maintaining the arrangement at any time ready for a new drilling or other coilable tubing operation.

BRIEF DESCRIPTION OF THE SEVERAL VIEWS OF THE DRAWING

The invention is further explained in the following, reference being made to an example of a possible embodiment shown in the attached drawings, wherein:

FIG. 3 corresponds to FIGS. 1 and 2, but here is shown how a tangential course is maintained upon uncoiling of coilable tubing by means of the feed-out/feed-in device through a successive rotation of the coiled tubing drum's pivotable rack part about an axis parallel to the rotational axis of the drum in relation to the remaining part of the common support rack where the feed-out/feed-in device is mounted, said tangential course being maintained in the same, yet in an opposite way, upon the coiling of the coilable tubing, the drum's rack part then rotating gradually in the opposite direction towards the starting position shown in FIG. 2. The rotational movements of the drum rack to and fro may be effected by means of an electronically controlled piston cylinder or the like.

FIGS. 4 and 5 show top plan views, corresponding to the preceding figures, and illustrates a way of mounting the drum displaceably to and fro in the direction of its rotational axis, resulting in an even distribution of the coiled tubing windings across the length of the core of the drum, FIG. 4 showing a carriage/slide for the drum occupying one end position on a guide rail or similar guiding/substrate, while FIG. 5 shows the same carriage/slide in the other end position on the guide rail.

DETAILED DESCRIPTION OF THE INVENTION

Figure 1:
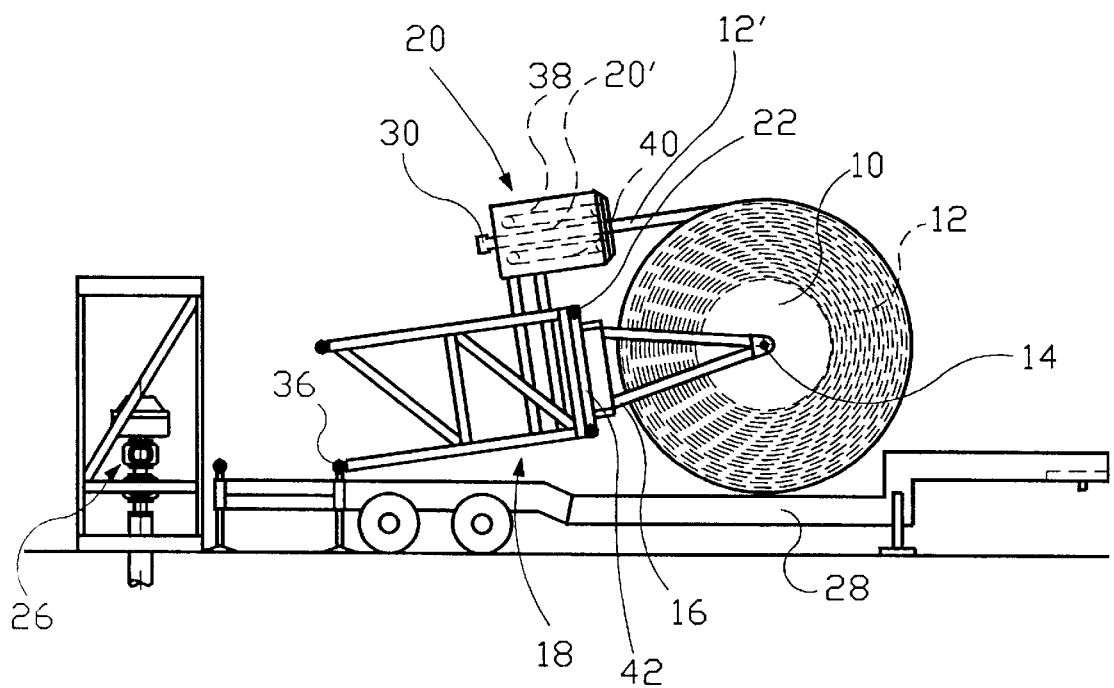
FIG. 1 shows a side elevational view of a coiled tubing drum disposed on a support rack which is common for the drum and a feed-out/feed-in device for the coilable tubing, and where the rack in the exemplary embodiment is carried on a mobile carriage, a blowout preventer being installed, and said common support rack and, thus, the coiled tubing drum as well as the feed-out/feed-in device for the coilable tubing for uncoiling/coiling thereof in relation to the drum occupy first position of readiness in relation to the blowout preventer, one lower end of the rack being pivotally coupled to a stationary point of articulation having a horizontal rotational axis.
Figure 2:
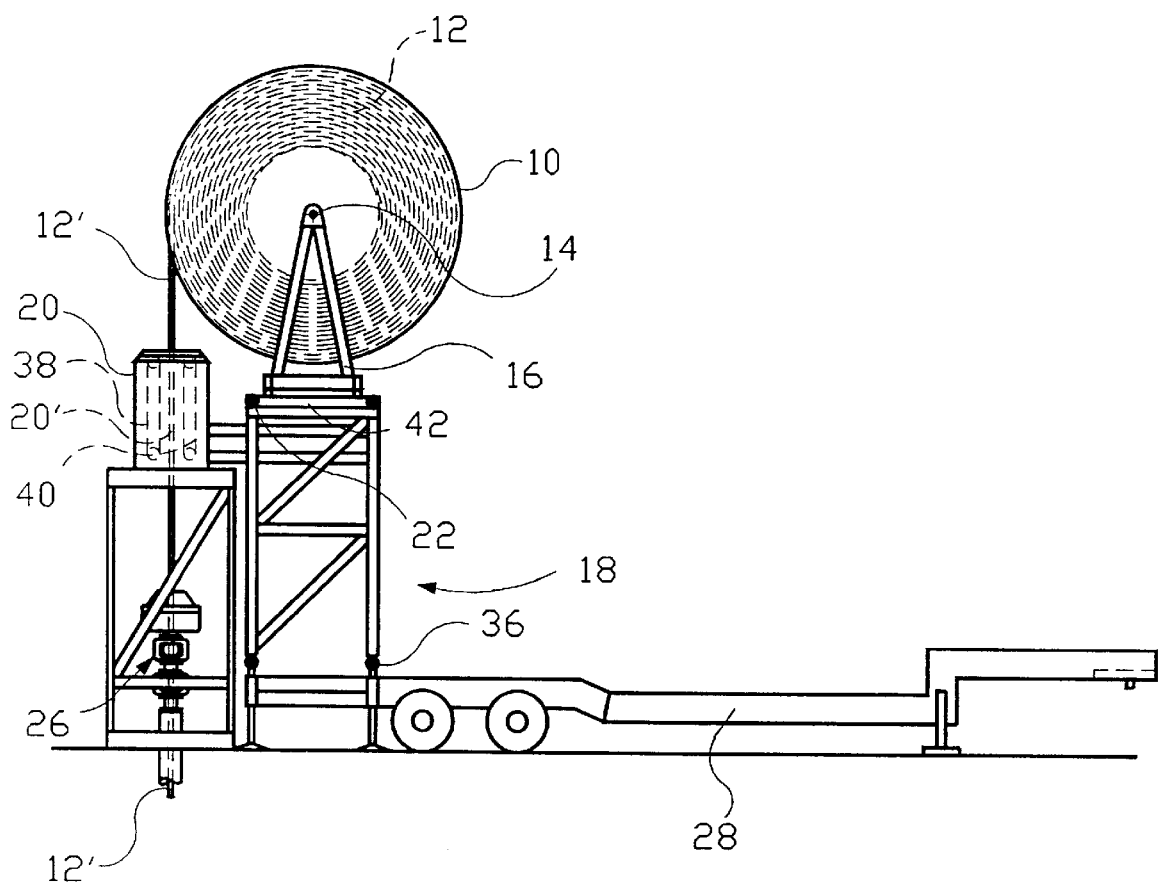
FIG. 2 corresponds to FIG. 1, but here the common rack of the coiled tubing drum and the feed-out/feed-in device are swung up about the point of articulation to a vertically upright-standing position where the feed-out/feed-in device's through-going passage for the coilable tubing is placed vertically aligned with the underlying blowout preventer.
Figure 3:
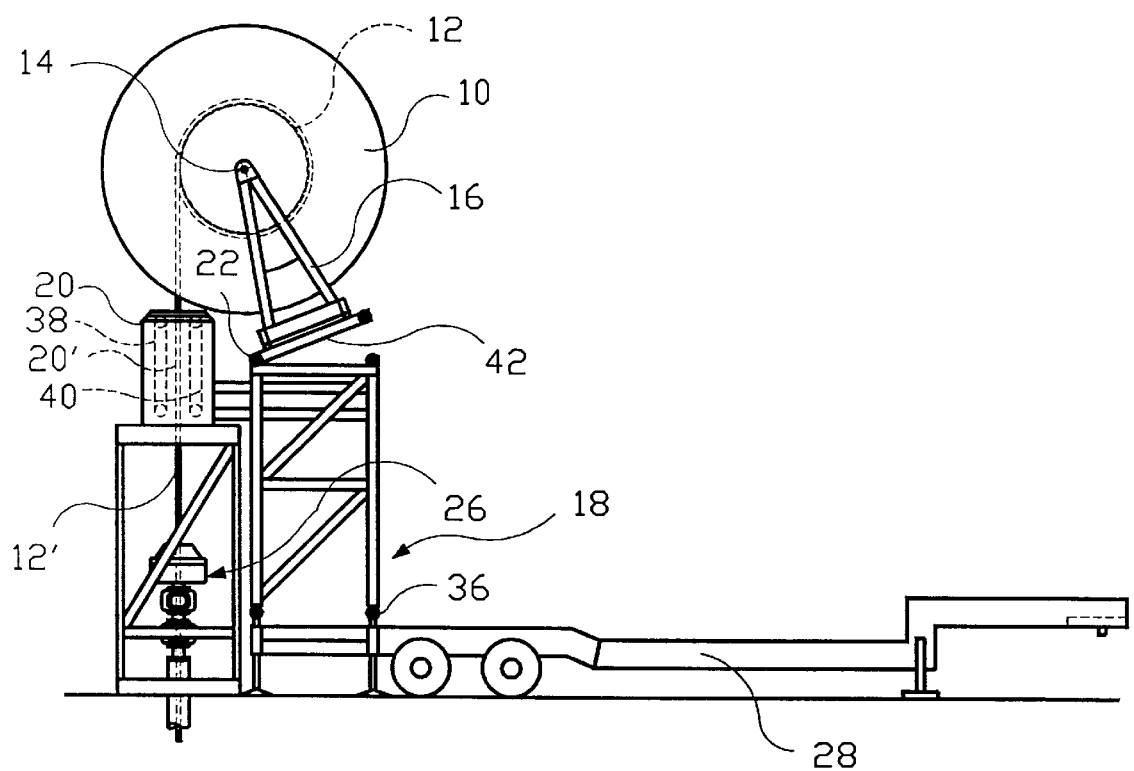

In the drawings, reference numeral 10 denotes a drum onto which a coilable tubing 12 has been coiled up as shown in, FIGS. 1 and 2. The drum 10 which is rotatable about a horizontal rotational axis 14, is built up in a usual way, comprising a central, often hollow core and a circle-disc-shaped end wall at each end of the core.

The coiled tubing drum 10 is carried by a rack part 16 of a support rack 18 which, likewise, carries a feed-out/feed-in device 20 for the coilable tubing 12. The rack part 16 is rotatable about a horizontal axis 22 in relation to the support rack 18, the lower end of the latter—in the exemplary embodiment shown—being coupled to an articulation or hinge 36 which is stationary and accurately positioned in relation to the blowout preventer 26.

According to the exemplary embodiment, the support rack 18 according to FIG. 1 rests on a mobile carriage or trailer 28, on which support rack 18 carrying coiled tubing drum 10 and feed-out/feed-in device 20 possibly may be conveyed. The situation in accordance with FIG. 1 may be considered as a first position of readiness in which the coiled tubing drum and the feed-out/feed-in device do not occupy positions to be operated immediately, and FIG. 2 can be considered to represent a second position of readiness in which drum carrying coilable tubing and the device 20 can be operated practically immediately. According to a distinctive feature of the present invention, in accordance with which an end connector 30 at the end of an outer coilable tubing portion 12' permanently occupies a connected position at the outer end of the feed-out/feed-in device 20 in relation to the drum 10, the coiled tubing arrangement is put into an absolutely optimal position of readiness.

This end connector 30 at which hydraulic hoses or current carrying cables or the like within the coilable tubing 12,12' are terminated, has too large cross-sectional dimensions to be capable of being threaded through the through-going passage 20' of the feed-out/feed-in device 20 at the same time as friction-creating contact with the coilable tubing, at opposite sides thereof, has to be established during the passage of the coilable tubing in one or the opposite direction through the device 20.

When the feed-out/feed-in device 20 is placed on the same support rack 18 as the coiled tubing drum 10 and accurately positioned in relation to the latter, so that an imagined continuation of the device's 20 through-going, linearly extending passage 20' is tangent to the circumference of the outermost coiled tubing coil on the drum 10, this end connector 30 may be permanently coupled to the coiled tubing end. This feature results in a substantial reduction of the rigging time in relation to prior art technique, representing a very substantial technical progress on this field where extra rigging time results in considerable additional costs.

In order to maintain the through-going, linearly extending passage's 20' tangential course in relation to the circumference of the outermost coiled tubing coil on the drum 10 during the feeding movements outwardly or inwardly of the coilable tubing 12,12' for the uncoiling or coiling thereof, respectively, in respect of the drum 10, the rack part 16 of the latter is rotatable about a horizontal axis 22 in relation to the rest of the support rack 18 carrying the feed-out/feed-in device 20.

The rotation of the pivotable rack part 16 of the drum 10 may also take place without special auxiliary means, the rigidity of the coilable tubing being utilized such that it, at any time, tries to maintain said tangential course in relation to the through-going passage 20' of the feed-out/feed-in device 20, the drum rack part 16 rotating successively about the axis 22, also as a consequence of the pulling or pushing effect exerted on the rack part 16 by the feed-out/feed-in device 20 upon uncoiling respectively coiling of coilable tubing 12 in respect of the drum 10. This pulling or pushing effect, respectively, in combination with the inherent rigidity properties of the coilable tubing opposing bending will, thus, without external influences be capable of maintaining the desired tangential course of the imagined continuation of the through-going passage 20' in relation to the circumference of the outermost coiled tubing winding on the drum 10.

Figure 4:
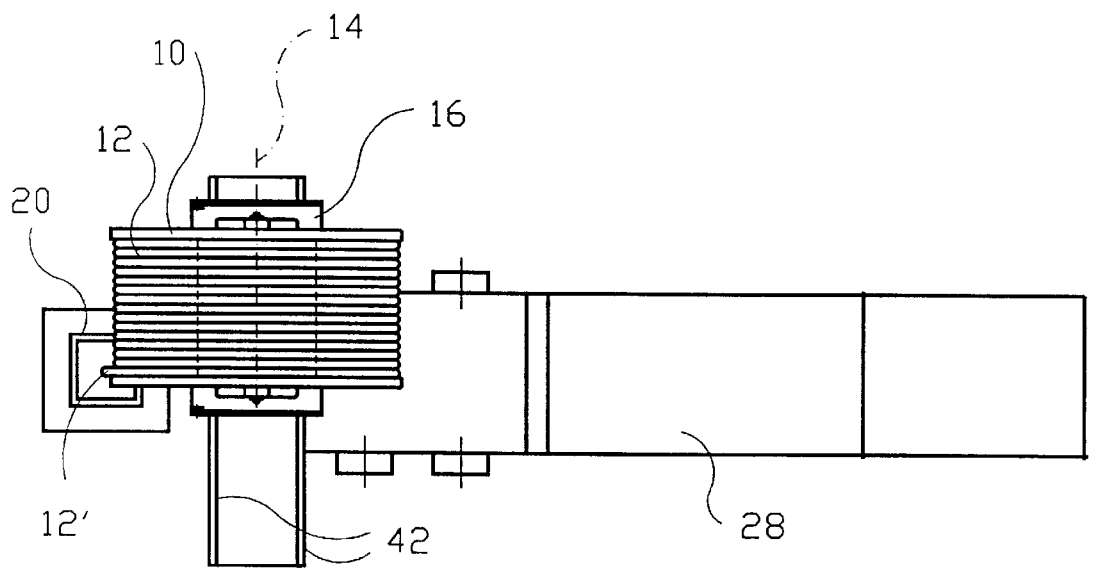
Figure 5:
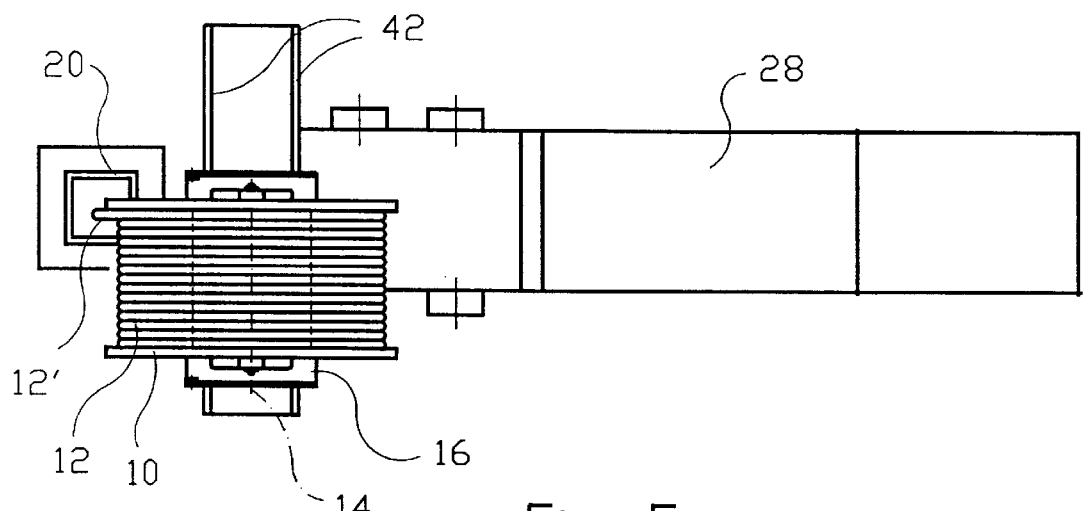

At an upper level, the support rack 18 carries guide rails 42 extending in the rotational axis direction 14 of the drum 10, and on which the upper rack part 16 is adapted to move as a slide/carriage to and fro in the longitudinal direction of the guide rails 42, as shown in FIG. 4 and 5.

This to and fro moving support of the coiled tubing drum 10 has the same effect as the known coiling/distributing devices for such coilable tubing. Thus, the coilable tubing 12,12' is coiled evenly up, distributed across the length of the drum core and, upon uncoiling, the drum 10 displaces itself such on the upper, slide- or carriage-like rack part 16 that the outermost coilable tubing winding's free vertical portion 12' is situated centrally above the underlying feed-out/feed-in device 20, a corresponding effect taking place upon the coilable tubing's coiling up on the drum.

For the sake of clarity, the feeding means 38, 40 of the device 20 are omitted in FIGS. 4 and 5.

The slide- or carriage-like upper rack part 16 can be displaced in the horizontal plane by means of e.g. hydraulic cylinders (not shown) and, likewise, the upper rack part 16 can be rotated about the articulation 22 by means of e.g. hydraulic cylinders (not shown).

What is claimed is:

1. The apparatus for coiling and uncoiling tubing comprising:

a support rack a rack member pivotally disposed on said support rack about an axis which is substantially horizontal when said apparatus is in use;

a rotary drum rotatably mounted on said rack member;

tubing wrapped around said drum for being uncoiled from said drum and coiled up on said rotary drum;

a feed out/feed in device fixed on said support rack and positioned proximate to said rotary drum, said feed out/feed in device having a rectilinear passage which is generally vertical when said apparatus is in use, said feed out/feed in device having means for propelling said tubing downwardly through said passage in a direction away from said rotary drum to pull the tubing off said drum or upwardly in a direction toward said rotary drum to push the tubing toward said rotary drum;

said pivotally mounted rack member being movable with respect to said support rack about said axis as the tubing is uncoiled/coiled up so that the tubing is aligned with said passage in said feed out/feed in device and is radially tangent to the outermost coiled tubing windings on said drum to assist in straightening the tubing when it is pulled off said drum by said feed out/feed in device and uncoiled from said rotary drum; and said tubing passing through said rectilinear passage having an end extending from said feed out/feed in device, said tubing end having an end connection affixed thereto, said end connector being greater in size than said rectilinear passage in a direction transverse to the direction of movement of said tubing through said rectilinear passage.

* * * * *